United States Patent [19]
Auberry

[11] 3,739,502
[45] June 19, 1973

[54] FOOTWEAR, ITS METHOD OF MANUFACTURE, AND WELT MATERIAL THEREFOR

[75] Inventor: Horace R. Auberry, Waynesville, N.C.

[73] Assignee: Ro-Search, Incorporated, Waynesville, N.C.

[22] Filed: Aug. 25, 1971

[21] Appl. No.: 174,893

Related U.S. Application Data

[63] Continuation-in-part of Ser. No. 861,429, Sept. 26, 1969, abandoned.

[52] U.S. Cl. .............................. 36/17 R, 12/142 D
[51] Int. Cl. ........................................ A43b 13/18
[58] Field of Search ...................... 36/78, 14, 17; 12/142 D, 142 E

[56] References Cited
UNITED STATES PATENTS 1,374,480  4/1921  Trull ..................................... 36/14
1,308,804  7/1919  Moulton ............................... 36/78

FOREIGN PATENTS OR APPLICATIONS 1,166,440  6/1958  France ................................. 36/78

Primary Examiner—Alfred R. Guest
Attorney—Dos T. Hatfield

[57] ABSTRACT

Footwear, its method of manufacture, and welt material therefor, wherein the welt material is a strip of moldable elastomer which may include for better stitching a strand of textile material, the strip being first secured such as by stitching to the upper and thereafter molded to form a welt bonded to the upper and to the thread of the stitching.

9 Claims, 4 Drawing Figures

PATENTED JUN 19 1973 3,739,502
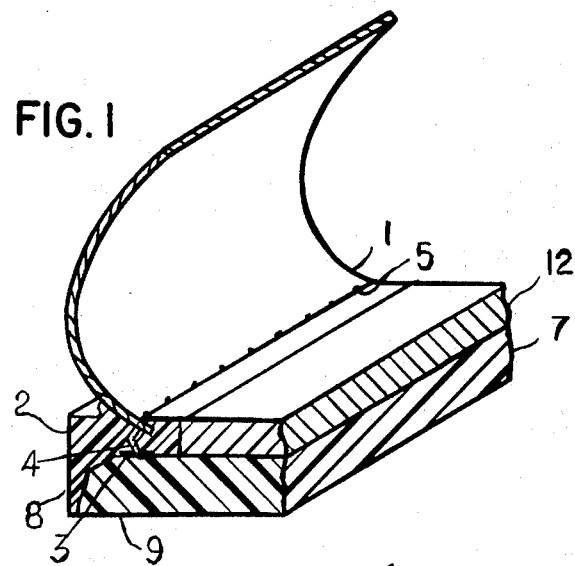
FIG. 1
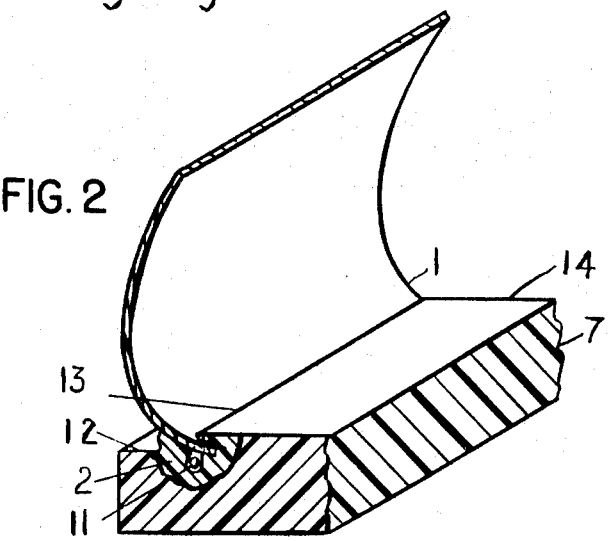
FIG. 2
FIG. 3
FIG. 4

FOOTWEAR, ITS METHOD OF MANUFACTURE, AND WELT MATERIAL THEREFOR

This application is a continuation-in-part of my co-pending application Ser. No. 861,429, filed Sept. 26, 1969, now abandoned.

In the manufacture of footwear such as shoes, it is customary to stitch welting to the bottom margin of the upper prior to the securing of the outsole to the welt. Welting of leather is now frequently replaced by welting of elastomeric material, such as vulcanized rubber or thermoplastic polymers, which is supplied to the shoe manufacturer molded into the desired final shape.

According to the invention, the elastomeric material is secured, such as by stitching, to the bottom margin of the upper before it is molded into the desired final shape, i.e., in the moldable state such as unvulcanized rubber strip. After the stitching, or securing by other means, of the bottom margin of the upper with the strip of moldable elastomer, they are placed into the cavity of a mold where the elastomer is molded into the desired shape of a welt and simultaneously said welt is also bonded to the upper and, if present, to the thread of the stitching. It is of advantage to secure in the same operation a prepared outsole to the shoe bottom or to mold simultaneously material for the sole to the shoe bottom. By following this sequence of steps a better product will be obtained at lower costs as the bonding of the welt to the upper and to the thread of the stitching or other securing means will assure a waterproof shoe with increased strength of connection between sole and upper, while the hitherto necessary separate step of molding and curing of the welt is eliminated.

As moldable elastomeric material is often relatively soft, such as unvulcanized rubber, and easily cut by the thread of stitching, the invention provides further that a strand of textile material in incorporated into the strip of moldable material so that the thread of the stitching can extend from the material of the upper to the textile material. The latter may be a narrow band of fabric adhering to the strip of unvulcanized rubber or a strand of yarn interposed between two layers of thermoplastic material, such as polyvinyl.

The drawings show in FIGS. 1 and 2 cuts taken along the bottom margin and sole edge of footwear according to the invention after completion of the molding and bonding step. FIGS. 3 and 4 show cross-sections of the moldable strip material for the welting with the inserts of textile material.

As seen in FIG. 1, the bottom margin 1 of the upper is connected by stitching 5 to the welt 2. The threads 4 of the stitching extend through the textile insert 3. Under the influence of the molding pressure the insert 3 might move and the threads 4 might bend, but as the welt material will bond to both the margin of the upper and to the threads, a strong and waterproof connection is assured, and, inherently, the welt formed by the molding intimately matches the configuration of the lower margin of the upper. A filler 12 and material to mold the outsole 7, if placed in the cavity of the mold, will allow to obtain in the same operation the molding of the welt material and of the sole, i.e. to obtain the completion of the shoe in this operation. By selection of a heavier strip of moldable material for the welting, it is possible to mold the entire side edge 8 of the sole from the welt material down to the tread surface 9.

As shown in FIG. 2, by selecting as material for the welt a narrower strip and placing into the mold sufficient material for the outsole to form also the filler, the welting might be hardly visible on the outside of the finished shoe, as even most of the upper rim 12 of the sole is formed by the outer sole material. As shown in FIG. 2, the stitching (zig zag stitching) 13 secures simultaneously the strip 2 of material for the welt and a socklining 14 to the bottom margin 1 of the upper. The textile strand in the strip 2 is here yarn 11.

FIG. 3 shows the simple cross-section of the strip 2 with the textile strand 3 at its bottom surface ready for stitching to the upper prior to the molding, while FIG. 4 shows the strip 2 with the yarn insert 11 as would be used for a shoe according to FIG. 2.

The term "elastomer" is used here to include material or synthetic rubber which is moldable in the un-cured, unvulcanized state, as well as similar materials which need no curing and which are moldable when heated, such as polyvinyl.

If the moldable elastomer of the welt is not compatible with the material of the upper, i.e. no bonding of the welt material to the bottom margin of the upper occurs, the method of the invention of molding the welt after securing it to the upper still brings the advantage of the elimination of a separate molding step for the welting, as well as the bonding of the welt to the sole, and if present, to the stitching.

The textile material placed on or into the moldable welt before securing it to the upper might serve not only to facilitate stitching, but might also and alternatively serve as general reinforcement of the welt.

What is claimed is:

1. A shoe comprising an upper, a welt of moldable elastomeric material and a sole, said welt being secured to the lower marginal portion of said upper by stitching, said welt being molded and bonded to the outer face of the lower marginal portion of said upper and also to said stitching, said sole being secured to said welt.

2. A shoe as set forth in claim 1 further including a textile reinforcing strand bonded to the lower face of said elastomeric welt and said stitching extending through said strand.

3. The method of manufacture of footwear comprising placing a strip of moldable elastomeric material to form a welt against the outer face of the bottom margin of an upper, stitching said strip to the bottom margin of said upper, placing said strip and bottom margin of said upper in a mold, molding and curing said strip so that said strip is formed into a welt and bonded to said bottom edge of said upper and to the thread of said stitching, and attaching the sole to said welt.

4. The method as set forth in claim 3 further characterized in that a strand of textile material is adhered to the face of said strip of moldable elastomeric material before said strip is placed against the outer face of the bottom margin of said upper.

5. A shoe comprising an upper, a welt of moldable elastomeric material and a sole, said welt being secured to the lower marginal portion of said upper by stitching, said welt being molded to the configuration of the lower marginal portion of said upper and in intimate contact therewith and bonded to said stitching, said sole being secured to said welt.

6. A shoe comprising an upper, a welt of moldable elastomeric material and a sole, means securing said welt to the lower marginal portion of said upper, said welt being molded to the configuration of the lower marginal portion of said upper and in intimate contact therewith and bonded to said securing means, said sole being secured to said welt.

7. A shoe as set forth in claim 6 further including a textile reinforcing strand bonded to the lower face of said elastomeric welt and said securing means extending through said strand.

8. The method of manufacture of footwear comprising placing a strip of moldable elastomeric material to form a welt against the bottom margin of an upper, securing said strip to the bottom margin of said upper, placing said strip and bottom margin of said upper in a mold, molding said strip so that said strip is formed into a welt, and attaching the sole to said welt.

9. The method as set forth in claim 8 further characterized in that a strand of textile reinforcement material is adhered to the face of said strip of moldable elastomeric material before said strip is placed against the bottom margin of said upper.

* * * * *